United States Patent
Wirola et al.

(10) Patent No.: US 9,843,905 B1
(45) Date of Patent: Dec. 12, 2017

(54) FLOOR DETECTION BASED ON DETERMINED FLOOR DETECTION PARAMETERS

(71) Applicant: HERE Global B.V., Eindhoven (NL)

(72) Inventors: Lauri Aarne Johannes Wirola, Tampere (FI); Muhammad Irshan Khan, Tampere (FI); Pavel Ivanov, Tampere (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/259,229

(22) Filed: Sep. 8, 2016

(51) Int. Cl.
   *H04W 64/00* (2009.01)
   *H04W 4/04* (2009.01)
   *G01S 5/02* (2010.01)

(52) U.S. Cl.
   CPC ........... *H04W 4/046* (2013.01); *G01S 5/0252* (2013.01)

(58) Field of Classification Search
   None
   See application file for complete search history.

(56) References Cited

U.S. PATENT DOCUMENTS

| | | | |
|---|---|---|---|
| 2009/0286548 A1* | 11/2009 | Coronel | H04W 4/20 455/456.1 |
| 2013/0035109 A1* | 2/2013 | Tsruya | G01S 5/0252 455/456.1 |
| 2013/0267251 A1* | 10/2013 | Khorashadi | H04W 4/023 455/456.3 |
| 2014/0243017 A1 | 8/2014 | Das et al. | |
| 2015/0149133 A1 | 5/2015 | Do | |
| 2015/0172872 A1* | 6/2015 | Alsehly | G01S 5/0236 455/457 |
| 2015/0212191 A1 | 7/2015 | Zhang et al. | |
| 2015/0249907 A1 | 9/2015 | Gupta et al. | |
| 2016/0198431 A1* | 7/2016 | Pattabiraman | H04W 4/043 455/414.2 |
| 2016/0285416 A1* | 9/2016 | Tiwari | H02S 50/15 |

FOREIGN PATENT DOCUMENTS

CN 1042102818 A 12/2014

OTHER PUBLICATIONS

S. Gansemer., Method and System for Location Estimation Abstract, http://ieeexplore.ieee.org/document/5648247, Mar. 22, 2016.

* cited by examiner

*Primary Examiner* — Daniel Lai
*Assistant Examiner* — Frank Donado
(74) *Attorney, Agent, or Firm* — Lempia Summerfield Katz LLC (57) ABSTRACT

A method is disclosed including determining at least one floor detection parameter based on a floor characteristic of a building; using the floor detection parameter in a floor detection process or providing the floor detection parameter for use in a floor detection process. Furthermore, a method is disclosed, including receiving at least one floor detection parameter determined based on a floor characteristic of a building, and using the at least one floor detection parameter in a floor detection process. According apparatuses, computer programs and systems are also disclosed.

16 Claims, 2 Drawing Sheets

FLOOR DETECTION BASED ON DETERMINED FLOOR DETECTION PARAMETERS

FIELD OF THE DISCLOSURE

The disclosure relates to the field of positioning terminals, and in particular pertains to detecting a floor of a building where a terminal is located.

BACKGROUND

Indoor positioning (i.e. position finding, including floor detection) requires novel systems and solutions that are specifically developed and deployed for this purpose. The "traditional" positioning technologies, which are mainly used outdoors, e.g. satellite and cellular positioning technologies, generally cannot deliver such performance indoors that would enable seamless and equal navigation experience in both environments. The required positioning accuracy (e.g. 2-3 m), coverage (e.g. ~100%) and floor detection are challenging to achieve with satisfactory performance levels with the systems and signals that were not designed and specified for the indoor use cases in the first place. Satellite-based radio navigation signals simply do not penetrate enough through the walls and roofs for adequate signal reception, and the cellular signals usually have too narrow bandwidth for accurate ranging by default.

For an indoor positioning solution to be commercially successful, that is, being globally scalable, having low maintenance and deployment costs, and offering acceptable end-user experience, the solution is advantageously based on an existing infrastructure in the buildings and on existing capabilities in the consumer devices. This leads to the conclusion that the indoor positioning is advantageously based on Wi-Fi- and/or Bluetooth (BT)-technologies that are already supported in every smartphone, tablet, laptop and even in the majority of the feature phones. It is, thus, required to find a solution that uses the Wi-Fi- and BT-radio signals in such a way that makes it possible to achieve e.g. 2-3 m horizontal positioning accuracy, e.g. close to 100% floor detection with the ability to quickly build the global coverage for this approach.

A promising approach for radio-based indoor positioning developed by the applicant of the present patent application models the radio environment (provided e.g. by Wi-Fi or Bluetooth beacons, or by beacons of another suited radio system) based on observed Received Signal Strength (RSS)-measurements as (e.g. two-dimensional or three-dimensional) radiomaps and is hereby able to capture the dynamics of the indoor radio propagation environment in a highly accurate way, that may even lend itself to compression. This makes it possible to achieve unprecedented horizontal positioning accuracy with the radio (e.g. Wi-Fi or Bluetooth) signals only within the coverage of the created radiomaps and also gives highly reliable floor detection.

Huge volumes of indoor radio measurements data can be harvested via crowd-sourcing if the consumer devices are equipped with the necessary functionality to enable the WiFi/Bluetooth data collection as a background process, naturally with the end-user consent. It is also possible to use volunteers to survey the sites (buildings) in exchange of reward or recognition and get the coverage climbing up globally in the places and venues important for the key customers.

SUMMARY OF SOME EXAMPLE EMBODIMENTS OF THE DISCLOSURE

Indoor spaces are inherently 3D and thus floor detection algorithms are essential for the best user experience. Floor detection algorithms are at least partially based on parameters of which optimal values are dependent upon the building type. While one parameter value set may work well for buildings with clear floors, another value set may work optimally in buildings with not-so-well defined floors (example: shopping malls with large vertical openings going through the floors). Physically, these building topologies differ in how much radio signals leak from one floor to another. Thus, the floor detection algorithm also needs to be aware of these differences. It is currently not known what can be used as external information to select the optimal parameter set for the floor detection algorithm.

It is, inter alia, an object of the present disclosure to improve one or more of the above-described shortcomings.

According to a first exemplary aspect of the present disclosure, a method is disclosed, the method comprising determining at least one floor detection parameter based on a floor characteristic of a building; and using the floor detection parameter in a floor detection process or providing the floor detection parameter for use in a floor detection process.

This method may for instance be performed and/or controlled by an apparatus, e.g. by a server or by a component, module or functional unit thereof. Alternatively, this method may be performed and/or controlled by more than one apparatus, e.g. by multiple servers, e.g. of a server cloud. The method may for instance comprise the determining of the at least one floor detection parameter by an apparatus, and the using of the floor detection parameter in the floor detection process by the apparatus. Alternatively, the method may for instance comprise the determining of the at least one floor detection parameter by an apparatus and the providing, by the apparatus, of the floor detection parameter to another apparatus for use in a floor detection process that is for instance performed by said another apparatus.

According to the first exemplary aspect of the disclosure, further a computer program is disclosed, the computer program when executed by a processor causing an apparatus (e.g. a server or a component, module or functional unit thereof, which may for instance comprise the processor) to perform and/or control the actions of the method according to the first exemplary aspect of the disclosure. The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to the first exemplary aspect of the disclosure, further an apparatus is disclosed, configured to perform and/or control or comprising respective means for performing and/or controlling the method according to the first exemplary aspect of the disclosure. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the first exemplary aspect of the disclosure, further an apparatus is disclosed, comprising at least one processor and at least one memory including computer program code, the at least one memory and the computer program code configured to, with the at least one processor, cause an apparatus (e.g. a server or a component, module or functional unit thereof) at least to perform and/or control the method according to the first exemplary aspect of the disclosure.

Any of the above-disclosed apparatuses according to the first exemplary aspect of the disclosure may be a component, module or functional unit for a device. The apparatus may for example be a chip. Alternatively, the disclosed apparatus according to the first exemplary aspect of the disclosure may be a device, for instance a server. The disclosed apparatus according to the first exemplary aspect of the disclosure may comprise only the disclosed components (e.g. means, processor, memory) or may further comprise one or more additional components.

In the following, exemplary features and exemplary embodiments of the first exemplary aspect of the present disclosure will be described in further detail.

A floor characteristic of a building may for instance be indicative of at least a building characteristic with respect to one or more floors, e.g. one or more passage(s) between floors or floor sections of the building. A passage as used herein may for instance be an elevator, an escalator, or a stair to name but a few examples. Information on the building may for instance be provided (e.g. entered into an apparatus according to the first exemplary aspect of the disclosure) by a user or may for instance be derived from a (e.g. rough, preliminary and/or previous) an estimate of the position of an electronic device of a user, wherein the position estimate may for instance be determined by the electronic device. For instance, the position estimate may for instance be a determined (e.g. current and/or coarse) position of the electronic device. The position estimate may for instance be determined by the at least one apparatus of the method according to the first aspect of the present disclosure.

A floor characteristic may for instance be related to a type of interconnection of at least two floors or floor sections of the building and/or a type of attenuation between at least two floors or floor sections of the building. Therein, a floor section denotes a part of a floor. The attenuation may for instance be a radio signal attenuation (e.g. an electromagnetic isolation) and may be caused by characteristics of the building, e.g. floor and/or ceiling thickness, and/or material used in floor and/or ceiling, which may cause different attenuation with respect to signal strength, in particular radio signal attenuation.

Further, a floor characteristic may for instance be a topological and/or structural characteristic of the building. A topological and/or structural characteristic of a building may for instance be indicative of layout information relating to at least part of the building. A part of the building may for instance be one or more floor(s) of the building, one or more passage(s) between one or more floor(s) of the building, e.g. one or more elevator(s), and/or escalator(s) and/or one or more stair(s), to name but a few examples. Further, a topological and/or structural characteristic of a building may for instance be (e.g. additionally) indicative of the spatial relationship between two or more topological and/or structural features of the building. A topological and/or structural characteristic may for instance comprise (e.g. additionally) information on the building indicative of at least one local characteristic of the building. Topological features may for instance be one or more area(s), one or more space(s), e.g. room(s), corridor(s), to name but a few examples. Structural features may for instance be one or more floor(s), one or more ceiling(s), one or more wall(s), and/or one or more door(s) of the building. Physically, a topological characteristic may for instance represent how much e.g. at least one radio signal leaks from one floor or floor section to another.

A floor characteristic may for instance be related to a type of lateral termination of at least two adjacent floors or floor sections and/or a type of delimitation of a floor or floor section from one or more other (e.g. adjacent) floors or floor sections. A type of delimitation may for instance be indicative of a degree of attenuation. For instance, a highly attenuating type of delimitation may cause a relatively high loss of signal strength, when e.g. a radio signal penetrates the type of delimitation, compared to a lowly attenuating type of delimitation causing a relatively low loss of signal strength when e.g. a radio signal penetrates the type of delimitation.

Further, the type of delimitation may for instance be indicative of a vertical delimitation of a floor or floor section from one or more other (e.g. adjacent) floors or floor sections. Vertical delimitation may for instance refer to signal propagation in an at least partly vertical propagation direction of the signal.

A floor characteristic of the building may for instance not be a path-loss parameter. 'Path-loss' as used herein may for instance be loss of signal strength between signal strength when sending the signal and signal strength when receiving the signal.

A floor characteristic may for instance be related to at least one of the following types of at least part of the building, also referred to as venue types: a closed-floor type, an isolated-floor type, an open-floor type.

A closed-floor type may for instance be related to at least one floor or floor section of the building with no vertical opening(s) (e.g. stairs or elevator shafts), but there may for instance be still significant signal leakage between at least two floors or floor sections of the building.

An isolated-floor type may for instance be related to at least one floor or floor section of the building having a (e.g. topological and/or structural) characteristic preventing a signal (e.g. a radio signal) from penetrating the at least one floor or floor section. For instance, the building may for instance comprise heavy topological and/or structural characteristic(s) preventing a signal (e.g. a radio signal) from penetrating from one floor or floor section to another. This may for instance apply to (in particular heavy) structure buildings, e.g. parking garages or buildings with similar (in particular heavy) structure.

An open-floor type may for instance be related to at least one floor or floor section of the building with at least partly vertical opening(s), that cause no significant attenuation, and/or cause a less attenuation of a signal (e.g. a radio signal) compared for instance to an isolated-floor type. Further, an open-floor type may for instance be related to one or more floor(s) or floor section(s) having completely open vertical structure, e.g. a floor section with no floor and/or ceiling, which may not cause any attenuation of a signal (e.g. a radio signal).

The floor detection process may use one or more floor detection parameters for detecting a floor, e.g. for detecting a floor an electronic device is currently located on (e.g. because a user that is carrying the electronic device is located (e.g. standing) on the floor). In addition to the one or more floor detection parameters, the floor detection process may for instance be based on a fingerprint received from the electronic device, and on a radiomap. The fingerprint may for instance comprise a list of one or more beacons (e.g. radio beacons) that can currently be observed (e.g. received with at least a pre-defined signal strength) by the electronic device, optionally with respective received signal strength (RSS) values. The radiomap may for instance be indicative of which beacons are observable at a plurality of locations (e.g. of a regular grid of locations), optionally also with associated RSS values.

For example, the floor detection process may have parameters that need to be set carefully in order to make the detection of a floor work. At least one floor detection parameter may be used for instance as an input being considered when causing e.g. an apparatus to control and/or perform the floor detection process. The floor detection parameter may for instance have an influence on the likelihood of correct floor detection. At least one floor detection parameter optimized for instance for an open-floor type may for instance be used in a floor detection process if the floor characteristic of the building, e.g. topology and/or structure of the floor or floor section is alike. In contrast, controlling and/or performing a floor detection process with at least one floor detection parameter optimized for an open-floor type may for instance result in incorrect floor detection if the floor characteristic of the building, e.g. topology and/or structure of the floor or floor section is not alike, e.g. an isolated-floor type or closed-floor type is present at the location of the building.

According to a second exemplary aspect of the present disclosure, a method is disclosed, the method comprising receiving at least one floor detection parameter determined based on a floor characteristic of a building; and using the floor detection parameter in a floor detection process.

This method may for instance be performed and/or controlled by an apparatus, e.g. by an electronic device, e.g. a terminal, for instance a mobile terminal like a mobile phone or a portable navigation device or a car or by a component, module or functional unit thereof. Further, a terminal may for instance be a mobile phone (e.g. smartphone), portable digital assistant, computer (such as for instance laptop or tablet), multimedia device (such as audio- and/or video player), gaming device or smart watch, to name but a few non-limiting examples.

It is to be understood that the aforementioned characteristics disclosed for the first exemplary aspect of the present disclosure, shall also be considered to be disclosed for the second exemplary aspect of the present disclosure.

In an exemplary embodiment of the present disclosure according to any of the above-described aspects of the present disclosure, the at least one floor detection parameter comprises one or more of the following:
  a parameter related to strength of a signal received from a beacon and affecting whether or not the beacon is considered in the floor detection process, in particular an RSS (Received Signal Strength) threshold value;
  a parameter related to a sensitivity of the floor detection process.

The at least one floor detection parameter may thus for instance comprise one, several or all of the above-listed parameters.

A parameter related to strength of a signal received from a beacon and affecting whether or not the beacon is considered in the floor detection process may for instance be an RSS (Received Signal Strength) threshold value. The threshold may for instance be predetermined or may for instance be adaptively determinable according to a pre-defined rule. For example, the threshold value may be adaptively determined, e.g. by using a processor of the at least one apparatus according to the first exemplary aspect of the present disclosure. In the floor detection process, then for instance only beacons from which signals are received at the electronic device (or the apparatus according to the first exemplary aspect of the present disclosure) with a signal strength that is smaller than or smaller-than-or-equal to the threshold value may be considered (information such as a respective position of the other beacons are then for instance discarded in the floor detection process). The parameter may take different values depending on the floor characteristic of the building The floor detection parameter related to a sensitivity of the floor detection process may for instance affect how fast and/or based on how many data sets (e.g. fingerprints) the floor detection process comes to a conclusion that a change of floors has taken place. The parameter may for instance represent one or a pre-defined number of sensitivity levels. For instance, there may be a high, medium and low sensitivity level, or a high and a low sensitivity level, to name but a couple of examples. The sensitivity level may for instance depend on the floor characteristic of the building. For instance, in isolated-type and/or closed-type scenarios, the sensitivity level may be high, whereas in open-type scenarios, the sensitivity level may be low, e.g. to avoid that the floor detection process erroneously indicates changes too quickly. The parameter may for instance affect how many (e.g. subsequently analyzed) data sets (e.g. fingerprints) have to indicate a change of the floor or how long a new finding that a floor change has taken place has to be stable before the floor detection algorithm actually outputs that a change of the floor has taken place. Accordingly, the floor detection parameter may be represented by a minimum number of data sets and/or minimum time of stability.

In this way, using the at least one floor detection parameter in a floor detection process comprising one or more of the aforementioned parameters enhances the floor detection process. In particular, the likelihood of correct floor detection is increased.

According to an exemplary embodiment of all aspects of the disclosure, the determining of the at least one floor detection parameter comprises selecting the at least one floor detection parameter from a set of at least two different floor detection parameters based on the floor characteristic.

The set of at least two different floor detection parameters may for instance comprise one or more parameters, which may for instance be used in the floor detection process or be provided for use in a floor detection process. The floor detection process may be using one or more floor detection parameters for detecting a floor, e.g. for detecting a floor an electronic device is currently located upon within the building. The set of at least two different floor detection parameters may for instance be pre-defined. For each of at least two different realizations of the floor characteristic, the set may for instance comprise one or more respective floor detection parameters suited for the respective realization. The floor detection parameters of the set may for instance have been determined for these different realizations of the floor characteristic before the floor detection process, e.g. based on simulations and/or measurements.

In an exemplary embodiment according to the first exemplary aspect of the present disclosure, the method further comprises determining the floor characteristic from a map of the building.

In an exemplary embodiment according to the second exemplary aspect of the present disclosure, the floor characteristic has been determined (e.g. by an apparatus or entity that is different from the apparatus according to the second aspect of the present disclosure) from a map of the building.

A map of the building may for instance be an indoor map of the building, e.g. one or more floor plan(s) or floor section plan(s) of the building, e.g. in the form of a constructional plan. The map of the building may for instance comprise one or more floor characteristic(s) of the building, in particular comprising one or more topological and/or structural characteristic(s) of the building, e.g. as disclosed above. The map of the building may in particular comprise information on some or all floors of the building, in particular on the interconnection of these floors.

The determining of the floor characteristic from a map of the building, in particular the indoor map of the building, may for instance be controlled and/or performed by using information explicitly stored, e.g. in a database, and/or e.g. linked to information being representative of the map of the building, or may for instance be derived by analysis of information being representative of the map of the building.

Further, the map of the building may for instance be generated a-priori, e.g. by a map provider.

According to an exemplary embodiment of the first exemplary aspect of the present disclosure, the method further comprises extracting from a map of the building a floor characteristic related to a venue type of the building; and selecting the at least one floor detection parameter based on the extracted floor characteristic.

In an exemplary embodiment according to the second exemplary aspect of the present disclosure, the at least one floor detection parameter is based on a floor characteristic related to a venue type of the building extracted from a map of the building.

A venue type may for instance be indicative of at least one of the following venue types: a closed-floor type, an isolated-floor type, an open-floor type, e.g. as disclosed above regarding the floor characteristic of a building.

In a further exemplary embodiment according to all aspects of the present disclosure, the map of the building is at least indicative of openings within at least one floor or floor section of the building. Further, in another exemplary embodiment according to all aspects of the present disclosure, the map of the building is at least indicative of openings between at least two floors or floor sections of the building.

Thus, it may for instance be derivable from the map of the building, if one or more floor(s) or floor section(s) of the building is/are of a closed-floor type, an isolated-floor type, or an open-floor type.

A closed-floor type may for instance be related to at least one floor or floor section of the building with no vertical opening(s) (e.g. stairs or elevator shafts), but there may for instance be still significant leakage (e.g. radio signal leakage) between at least two floors or floor sections of the building.

An isolated-floor type may for instance be related to at least one floor or floor section of the building having a (e.g. topological and/or structural) characteristic preventing a signal (e.g. a radio signal, e.g. from a beacon) from penetrating the at least one floor or floor section. For instance, the building may for instance comprise heavy topological and/or structural characteristic(s) preventing a signal (e.g. a radio signal) from penetrating from one floor or floor section to another. This may for instance apply to (in particular heavy) structure buildings, e.g. parking garages or buildings with similar (in particular heavy) structure.

An open-floor type may for instance be related to at least one floor or floor section of the building with at least partly vertical opening(s), that cause no significant attenuation, and/or cause a less attenuation of a signal (e.g. a radio signal) compared for instance to an isolated-floor type. Further, an open-floor type may for instance be related to one or more floor(s) or floor section(s) having completely open vertical structure, e.g. a floor section with no floor and/or ceiling, which may not cause any attenuation of a signal (e.g. a radio signal).

According to an exemplary embodiment of all aspects of the present disclosure, the floor characteristic is location-dependent within the building. For instance, a floor or floor section of a building may have another floor characteristic associated to it than another floor or floor section of the building.

In the alternative, the floor characteristic may for instance not be location-dependent within the building. For instance, in this case there may be a general floor characteristic associated to a building type, e.g. one floor characteristic for a parking hall, and another floor characteristic to a shopping mall, to name but a few examples. Thus, a floor characteristic may for instance be the same for the entire building, independent of floors or floor sections within the building. Further, for example there may be the same floor characteristic associated to different building types, e.g. only one floor characteristic for a parking hall and the same floor characteristic to a shopping mall to name but a few examples.

In a further exemplary embodiment according to the first exemplary aspect of the present disclosure, wherein the floor characteristic is location-dependent within the building, the method further comprises determining the floor characteristic from a map of the building under consideration of a location within the building for which the floor detection process shall be performed.

In a further exemplary embodiment according to the second exemplary aspect of the present disclosure, wherein the floor characteristic is location-dependent within the building, the floor characteristic has been determined from a map of the building under consideration of a location for which the floor detection process shall be performed.

A floor or a floor section of a building may have another floor characteristic associated to it than another floor or floor section of the building. Under consideration of the location (which may for instance be a coarse estimate of the location, which may then at least partially be improved or refined by the floor detection process), the floor characteristic may for instance be determined so that the floor characteristic of the location, e.g. current location of an electronic device of a user, is determined appropriately with respect to the location, e.g. open-floor type, isolated-floor type, or closed-floor type.

According to an exemplary embodiment of the first exemplary aspect of the present disclosure, the method comprises adaptively determining the at least one floor detection parameter during the floor detection process or providing an adaptively determined at least one floor detection parameter for use in a floor detection process.

In an exemplary embodiment according to the second exemplary aspect of the present disclosure, the at least one floor detection parameter is adaptively determined during the floor detection process.

For example, the at least one floor detection parameter that is used in the floor detection process may have to be set carefully in order to make the detection of a floor work (or even work optimally). The at least one floor detection parameter used in the floor detection process may for instance be adaptively determined according to a pre-defined rule during the floor detection process, or the at least one floor detection parameter may for instance be adaptively determined according to a pre-defined rule and provided at least twice during the floor detection process. The adaptively determining or the providing of the adaptively determined floor detection parameter may for instance be useful when e.g. the location of an electronic device of a user changes during the floor detection process. The adaptation according to a pre-defined rule may thus for instance be based on current location of the electronic device, which may for instance change during the floor detection process.

The adaptive determining of the at least one floor detection parameter may for instance be performed and/or controlled according to a pre-defined rule on a regular or irregular basis, e.g. in regular or irregular time intervals. The time intervals after which the adaptive determining of the at least one floor detection parameter may be caused, may for instance be set prior to performing and/or controlling the method according to the first exemplary aspects of the present disclosure, e.g. by the at least one apparatus according to the first exemplary aspect of the present disclosure. Further, it will be understood that the time interval may for instance be determined and/or be dependent from one or more other parameters, e.g. from a type of the at least one floor detection parameter, or from the at least one floor detection parameter itself. Thus, it may be possible that the at least one floor detection parameter may for instance comprise a value indicative of an appropriate time interval to be used. For instance, the time interval may be set in dependence on whether a floor or floor section of the building is of open-floor type, isolated-floor type or closed-floor type.

In a further exemplary embodiment according to all aspects of the present disclosure, a Kalman filter and/or an extended Kalman filter is used for the floor detection process.

Kalman filters are often used for location tracking, thus it may for instance be a suitable floor detection process. Kalman filters may be used for describing how a state, e.g. a location, changes over time. Using Kalman filters, a new location may for instance be predicted as well as its uncertainty, and the predicted new location may for instance be corrected with a new measurement of the current location. Thus, Kalman filters use current and predicted location for location tracking. With regard to floor detection, a current floor may for instance be determined e.g. by measuring, e.g. via WiFi-Positioning the current location of an electronic device. A Kalman filter may be used for detecting a floor by predicting the floor and its uncertainty. In order to get the best results, or for achieving that the floor detection process works optimally, the determined at least one floor detection parameter may for instance be used in the floor detection process, e.g. controlled and/or performed by using a Kalman filter.

At least one floor detection parameter needs to be set carefully in order to make the floor detection process work (or work optimally). Thus, the at least one floor detection parameter is determined based on a floor characteristic to ensure that the floor detection process, e.g. by supporting the floor detection process by a Kalman filter, works (or works optimally).

According to an exemplary embodiment of all aspects of the present disclosure, the floor detection process is a nonlinear process. In order to make the floor detection process work optimally, e.g. for ensuring the most accurate floor detection, a detected floor as a result from the floor detection process may for instance be used additionally when controlling and/or performing another iteration of the floor detection process.

Other features of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE DISCLOSURE

Figure 1:
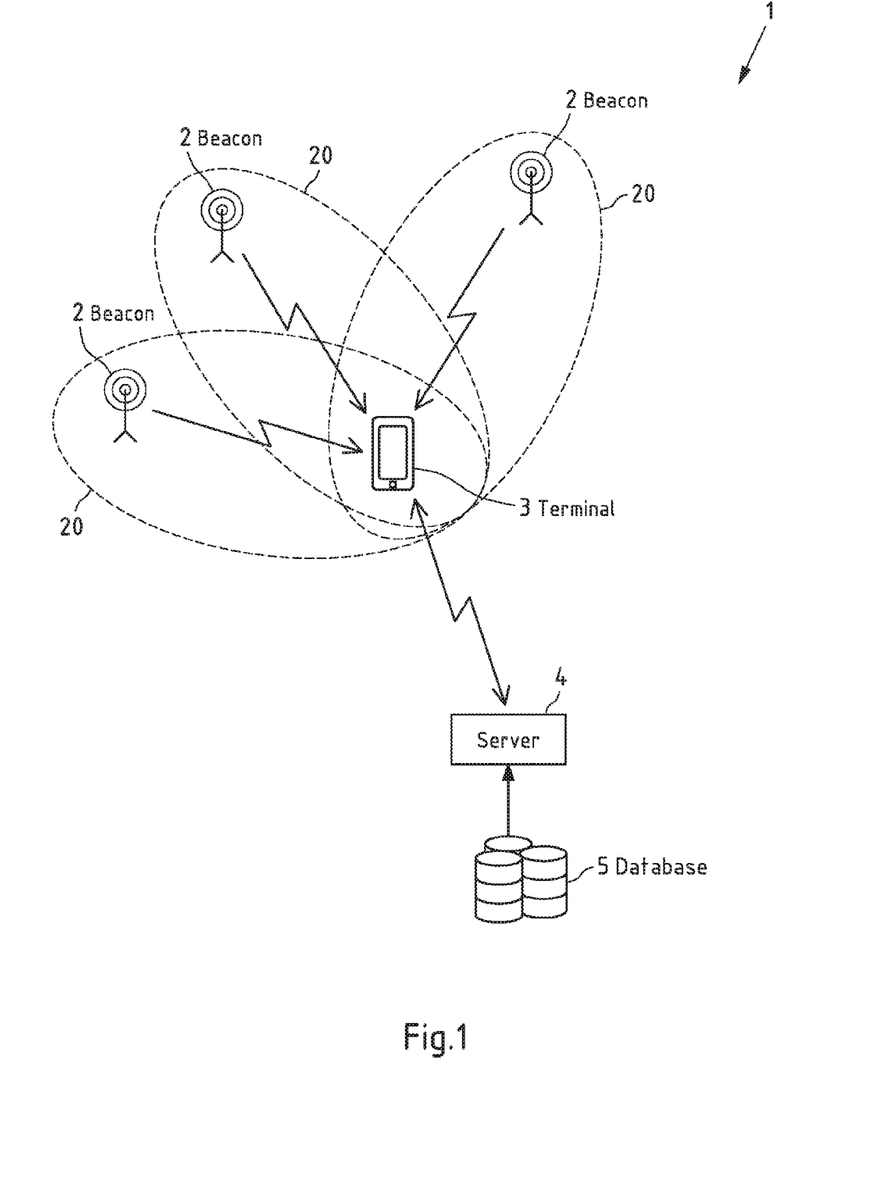
FIG. 1 is a schematic illustration of a system in which example embodiments of the present disclosure may be used.

FIG. 1 is a schematic illustration of a system 1, e.g. a positioning system, in which example embodiments of the present disclosure may be used. System 1 comprises a plurality of beacons 2 deployed in an (e.g. indoor) area, a terminal 3 (e.g. a mobile phone), a server 4 that is in e.g. wireless communication with terminal 3, a database 5 to which server 4 has access, and a floor detection process 6 that also has access to database 5.

The beacons 2 may for instance be deployed across the floors of the building, e.g. with one or more beacons 2 on each floor of the building. In the following, it is exemplarily assumed that the beacons 2 are radio beacons. Non-limiting examples of radio beacons are Bluetooth beacons (including iBeacons), Wi-Fi (e.g. IEEE 802.11-based) beacons, NFC (Near Field Communication) beacons, AM (Amplitude modulated), VHF (very high frequency), or UHF (ultra high frequency) broadcast radio stations and cellular base stations (e.g. GSM (Global System for Mobile Communications), UMTS (Universal Mobile Telecommunications System), LTE (Long Term Evolution) base stations). Alternatively, the beacons may be based on optic or acoustic signal transmission.

Each of beacons 2 is associated with a respective coverage area 20, which is representative of an area (in particular a two-dimensional (2D) or three-dimensional (3D) area) in which the respective beacon 2 is observable by a terminal 3. A beacon 2 may for instance be observable by a terminal 3 if the terminal can receive a signal from beacon 2 with a signal strength that is equal to or larger-than-or-equal-to a pre-defined threshold and/or equal to or larger-than-or-equal-to a minimum, for instance pre-defined, RSS, and/or if terminal 3 is able to receive a signal from beacon 2 and obtain an identifier of beacon 2 from the received signal, e.g. by demodulation and decoding.

A coverage area 20 of a beacon 2 may for instance be represented as a plurality of value tuples, wherein each value tuple defines a location (e.g. in terms of coordinates, e.g. geodetic coordinates, 2D- or 3D-coordinates) and information representative of a strength with which a signal transmitted by the beacon 2 can be received at this position (received signal strength, RSS). Here and in the following, when referring to a RSS, in particular the average RSS is meant (e.g. averaged over a plurality of measurements at the same position over time). The RSS may for instance be measured in dBm, for instance with a reference value of 1 mW, with or without the Doppler effect being averaged out therein. The positions may for instance lie on a grid of positions, in particular a regular grid (e.g. a grid with respectively equidistant grid points in each direction). The positions may for instance be 2D or 3D positions. Accordingly, the grid may then be a 2D or 3D grid.

In case of 3D positions, one dimension may for instance be represented by a floor level (as a representation of a vertical position), and the other two dimensions may describe a 2D position on a floor indicated by the floor level.

The respective coverage areas 20 of the plurality of beacons 2 deployed in the area, e.g. on a floor or floor section of a building, may for instance be represented by a coverage map, in particular a radiomap. For instance, the coverage map may be based on a grid of (2D or 3D) positions, wherein for each grid position, an information is available that indicates which beacon is observable at this position (e.g. by means of a beacon identifier) and with which received signal strength. This coverage map may for instance serve as a sample map for estimating a position indoor within a building, e.g. using WiFi-Positioning.

It should be noted, however, that a coverage area 20 may also be represented without information on a received signal strength, and then merely reflect where the beacon of the coverage area 20 is observable. Then, also the coverage map may only be indicative of where a beacon 2 can be observed, but not with which received signal strength.

The coverage map may for instance be generated and/or updated by a coverage map generation/update server (which may server 4, or another apparatus) and stored in a coverage map storage, e.g. database 5 of FIG. 1. The coverage map generation/update server may for instance generate and/or update the coverage map based at least partially based on crowd-sourcing. To this end, e.g. a plurality of terminals that are equipped with position sensors (e.g. GNSS (Global Navigation Satellite System) sensors such as GPS (Global Positioning System) sensors), and/or WiFi-Positioning or can otherwise (e.g. determine their position) provide, for a plurality of positions in the area where the beacons 2 are deployed, information on the respective position and on the one or more beacons 2 that can be observed at the respective position. Optionally, further information on the RSS with which signals from the respective beacons 2 are observed at the respective position may be provided by the terminals. From this information, the coverage map generation/update server may then generate a coverage map for the area or may update an existing coverage map for the area. For instance, each information on a position and on the one or more beacons observable at this position (optionally with associated RSS values) may be processed by choosing, from a grid, the position that is closest to the position indicated by the information and associating the one or more beacons (and the associated RSS values, if available), with this chosen grid position.

The coverage map may for instance by stored in database 5, which is accessible by server 4 (e.g. via a network not shown in FIG. 1, e.g. via the Internet) to enable server 4 to estimate respective positions of terminals 3 located in the area where the beacons 2 are deployed, e.g. by comparing one or more parameters with respect to observable beacon(s) 2 to pre-stored parameters of the coverage map. The terminals 3 (of which only one is shown in FIG. 1) may for instance be capable of observing and identifying beacons 2, in particular by receiving signals transmitted by the beacons 2 and by evaluating identification information comprised in these signals. This identification information may for instance be a respective identifier of the respective beacon 2, which may for instance be (e.g. globally or at least locally) unique. In case of Wi-Fi beacons, the identifier may for instance be an SSID (Service Set Identifier).

Terminals 3 for instance determine (in particular measure) so-called fingerprints and provide them to server 4. A fingerprint may for instance comprise respective identifiers of the one or more beacons 2 that are observable by the terminal 3 at the current position of the terminal 3, optionally with associated RSS values. Further optional, the fingerprints may comprise further information that aid in determining a position estimate, e.g. barometric information that may assist an entity to determine the floor level as part of the position estimate. Based on such a fingerprint, server 4 can determine an estimate of the position of terminal 3. Server 4 for instance receives the fingerprint from terminal 3 (via an at least partially wireless connection that may involve further infrastructure, e.g. of a cellular communication system and/or a Wi-Fi system) and returns an estimate of the position of terminal 3 back to terminal 3.

Alternatively, the position estimate may be determined by terminal 3, based on the fingerprint determined by terminal 3 (this alternative scenario is not illustrated in FIG. 1). This requires terminal 3 to have access to the coverage map, which may for instance be accomplished by at least temporarily storing a local copy of at least a part of the coverage map on terminal 3.

An accuracy of the estimate of the position of terminal 3 may increase with the number of the beacons 2 observable at the position of the terminal 3 and/or with the arrangement of the beacons 2 with respect to the position of the terminal 3. The position of the terminal 3 is for instance estimated to lie in the center of the intersection of the respective coverage areas of the beacons that are observed by terminal 3. The accuracy of the position estimate is generally higher if further information, e.g. RSS is provided in the fingerprint and can be compared against the coverage map, or parameters of the coverage map.

The terminals 3 may for instance not comprise GNSS sensors and thus may have to rely on a fingerprint-based positioning approach either performed by server 4 or the terminal 3 itself. The fingerprint-based positioning approach may however also constitute an add-on to an existing further positioning technique (like a GNSS sensor based positioning technique) that is implemented in terminal 3.

Terminals 3 may for instance be electronic devices, in particular portable electronic devices (e.g. with a weight less than 2 kg or 200 g, to name but a few examples). Terminals 3 may for instance be mobile phones (e.g. smartphones), portable digital assistants, computers (such as for instance laptops or tablets), multimedia devices (such as audio- and/or video players), gaming devices or smart watches, to name but a few non-limiting examples. Depending on the type of beacon 2 deployed in the area, e.g. Bluetooth and/or Wi-Fi beacons, the terminals 3 may for instance be capable of receiving and at least partially processing (e.g. to at least be able to derive a beacon identifier and to optionally determine an RSS value) Bluetooth and/or Wi-Fi signals, to name but some examples.

According to example embodiments of the present disclosure, in system 1, a floor detection process that allows detection of a floor level of a building where terminal 3 is currently located, is implemented. This floor detection process may for instance be part of a process that determines an estimate of the position of terminal 3 as described above. For instance, if the position is a three-dimensional position that includes a floor level and a two-dimensional position with respect to this floor level, the floor level of this three-dimensional position is determined by the floor detection process. If the floor detection process is a part of the process for determining the position estimate, the floor detection process may be performed by the same entity (e.g. server 4 or terminal 3) that determines the position estimate. However, it is also conceivable that different entities perform the floor detection process and the estimation of the position of the terminal 3. For instance, the floor detection process may be performed by server 4. The resulting floor level estimate may then be provided to terminal 3 which may then, based on the obtained level estimate, estimate the (entire) position of terminal 3 by estimating the two-dimensional position of terminal 3 on the floor indicated by the obtained floor level.

Figure 2:
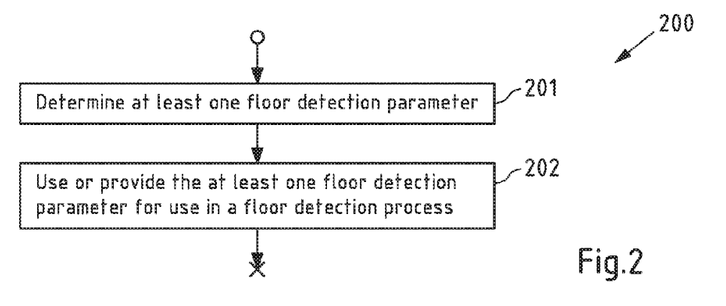
FIG. 2 is a flow chart illustrating an example embodiment of a method according to the first exemplary aspect of the disclosure.

FIG. 2 is a flow chart 200 illustrating an example embodiment of a method according to the first aspect of the disclosure. This flowchart 200 may for instance be performed by server 4 or terminal 3 of FIG. 1.

In a step 201 of flow chart 200, at least one floor detection parameter is determined. The at least one floor detection parameter is for instance determined based on a floor characteristic of a building.

In a step 202, the at least one floor detection parameter is used in a floor detection process, or the at one floor detection parameter is provided for use in a floor detection process.

For instance, step 201 and the first alternative of step 202 may be performed by server 4 of FIG. 1, or by terminal 3 of FIG. 1, which may then also implement the floor detection process. Alternatively, step 201 and the second alternative of step 202 may be performed by server 4 in a way that the at least one floor detection parameter is provided to terminal 3, which in turn uses the at least one floor detection process in a floor detection process implemented by terminal 3.

Figure 3:
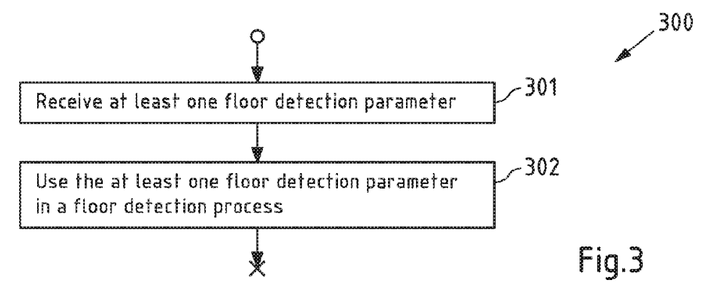
FIG. 3 is a flow chart illustrating an example embodiment of a method according to the second exemplary aspect of the disclosure.

FIG. 3 is a flow chart 300 illustrating an example embodiment of a method according to the second aspect of the disclosure.

In a step 301 of flow chart 300, at least one floor detection parameter is received. The at least one floor detection parameter has been determined based on a floor characteristic of a building, e.g. determined by server 6 of FIG. 1.

In a step 302 of flow chart 300, the at least one floor detection parameter is used in a floor detection process, e.g. floor detection process 6 of FIG. 1.

Therein, steps 301 and 302 may for instance be performed by terminal 3 of FIG. 1, or by server 4 of FIG. 1. In the former case, terminal 3 may for instance receive the at least one floor detection parameter from server 4 or from another apparatus, and in the latter case, server 4 may for instance receive the at least one floor detection parameter from terminal 3 or from another apparatus.

The at least one floor detection parameter, e.g. determined at step 201 of FIG. 2, or received at step 301 of FIG. 3, may for instance comprise one or more of the following: (i) a parameter related to strength of a signal received from a beacon and affecting whether or not the beacon is considered in the floor detection process, in particular RSS (Received Signal Strength) threshold value; (ii) a parameter related to a sensitivity of the floor detection process (e.g. with respect to floor changes).

The at least one floor detection parameter may for instance be selected from a set of at least two different floor detection parameters based on the floor characteristic.

The floor characteristic may for instance be determined from a map of the building. The map of the building may for instance be comprised by the coverage map, and/or may be optionally stored in a storage, e.g. database 5 of FIG. 1 or a separate database.

Further, a floor characteristic related to a venue type of the building may be extracted from the map of the building (e.g. as the floor characteristic of the building); and the at least one floor detection parameter may be selected based on the extracted information. The venue type of the building may for instance be indicative of an open-floor type, an isolated-floor type, or a closed-floor type of one or more floor(s) or floor section(s) of the building.

The map of the building may for instance at least be indicative of openings (e.g. passages) between at least two floors or floor sections of the building, in particular indicative of vertical openings between at least two floors or floor sections of the building. These openings may for instance be elevators, escalators and/or stairs to name but a few typical examples.

The floor characteristic, e.g. used for the determining the at least one floor detection parameter, may for instance be location-dependent within the building. For instance, a floor or a floor section of the building may have another floor characteristic associated to it than another floor or floor section of the building. The at least one floor detection parameter may thus for instance at least partially be determined under consideration of on an estimate of the location of terminal 3, which may for instance be a coarse location estimate and/or a previous location estimate. The floor detection process may thus allow for a floor level estimate that is more accurate than a floor level estimate contained in the estimate of the location of terminal 3 based on which the floor detection parameter is determined.

Alternatively, the floor characteristic may for instance be not location-dependent within the building. For instance, in this case there may be a general floor characteristic associated to a building type, e.g. a floor characteristic for a parking hall, another floor characteristic to a shopping mall to name but a few examples. Thus, a floor characteristic may for instance be the same for the entire building, independent of floors or floor sections within the building.

The at least one floor detection parameter may for instance be adaptively determined (e.g. adaptively with respect to the location of the terminal 3) during the floor detection process. For instance, the floor detection parameter may be determined in regular intervals (e.g. according to a pre-defined schedule) or irregular intervals (e.g. in response to pre-defined events, which may for instance comprise to changes in position of the terminal 3 that exceed a pre-defined threshold) (step 201 of FIG. 2) and used in or provided for use in the floor detection process (step 202 of FIG. 2).

Figure 4:
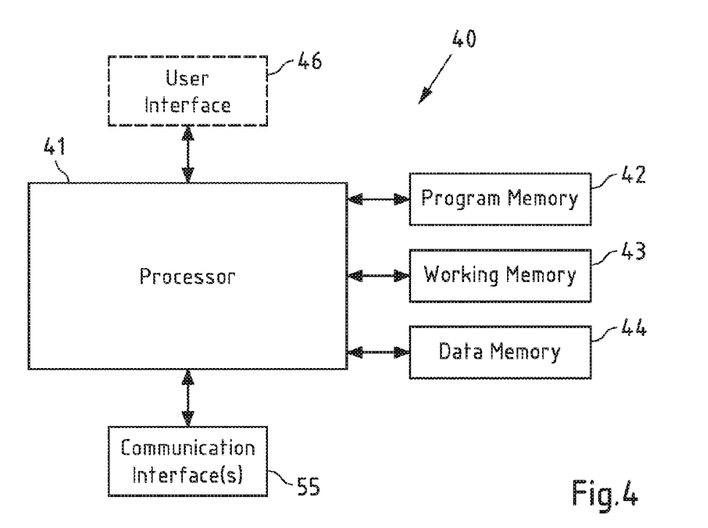
FIG. 4 is a block diagram of an example embodiment of an apparatus according to the disclosure.

FIG. 4 is a schematic block diagram of an example embodiment of an apparatus 40 according to the disclosure. Apparatus may for instance represent server 4 or terminal 3 of FIG. 1, or respective parts thereof.

Apparatus 40 comprises at least one processor 41 and at least one program memory 42 including computer program code, the at least one program memory 42 and the computer program code configured to, with the at least one processor 41, cause an apparatus (for instance apparatus 40, or another apparatus that comprises apparatus 40) at least to perform the method according to the first or the second exemplary aspect of the present disclosure. Processor 41 for instance executes the computer program code stored in program memory 42. Processor 41 for instance accesses program memory 42 via a bus. The computer program code stored in program memory 42 is an example of a computer program code according to the respective first or second aspect of the present disclosure, i.e. a computer program code that when executed by processor 41 causes apparatus 40 (or an apparatus that comprises apparatus 40) to perform the actions of the method according to the first or second aspect of the disclosure.

Apparatus 40 is also an example embodiment of an apparatus that is configured to perform and/or control or comprises components for performing and/or controlling the method according to the first and/or second aspect of the present disclosure.

Program memory 42 may also be included into processor 41. This memory may for instance be fixedly connected to processor 41, or be at least partially removable from processor 41, for instance in the form of a memory card or stick. Program memory 42 may also comprise an operating system for processor 41. Program memory 42 may also comprise a firmware for apparatus 40. Program memory 42 may for instance comprise a first memory portion that is fixedly installed in apparatus 40, and a second memory portion that is removable from apparatus 40, for instance in the form of a removable SD memory card.

Apparatus 40 further comprises data memory 44. Processor 41 for instance accesses data memory 44 via a bus. Data memory 44 may also be included into processor 41. Data memory 44 may for instance be fixedly connected to processor 41, or be at least partially removable from processor 41, for instance in the form of a memory card or stick. Data memory 44 may for instance comprise a first memory portion that is fixedly installed in apparatus 40, and a second memory portion that is removable from apparatus 40, for instance in the form of a removable SD memory card.

Program memory 42 and/or data memory 44 may for instance be a non-volatile memory. It may for instance be a FLASH memory (or a part thereof), any of a ROM, Programmable ROM (PROM), Erasable PROM (EPROM), Electrically Erasable PROM (EEPROM), Magnetoresistive Random Access Memory (MRAM) or a Ferroelectric Random Access Memory (FeRAM) memory (or a part thereof) or a hard disc (or a part thereof), to name but a few examples.

In the apparatus 40, processor 41 interfaces with a working memory 43, for instance in the form of a volatile memory. It may for instance be a Random Access Memory (RAM) or Dynamic RAM (DRAM), to give but a few non-limiting examples. It may for instance be used by processor 41 when executing an operating system and/or computer program code.

Processor 41 further controls a communication interface 46 configured to receive and/or output data and/or information. For instance, communication interface 46 may be configured to communicate with one or more (e.g. remote) devices, e.g. with server 4 (see FIG. 1) when acting as terminal 3 of FIG. 1, or with database 5 and/or one or more of terminals 3 when acting as server 4 of FIG. 1. The communication may for instance be wire-bound, or may at least partially (or entirely) be based on a wireless communication connection.

Processor 41 (and also any other processor mentioned in this specification) may be a processor of any suitable type. Processor 41 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 41 may for instance be an application processor that runs an operating system.

Some or all of the components of the apparatus 40 may for instance be connected via a bus. Some or all of the components of the apparatus 40 may for instance be combined into one or more modules.

In an example embodiment of the present disclosure, apparatus 40 represents server 4 of FIG. 1, and implements steps 201 and the first alternative of step 202 of FIG. 2 as well as the floor detection process. Apparatus 40 then for instance determines a floor characteristic of the building from a map of the building that is stored in database 5 or in data memory 44. Therein, an e.g. coarse location estimate that is available to apparatus 40 (e.g. from a previous step of estimating a location of terminal 3) is used for determining the floor characteristic, e.g. by searching the map for the floor characteristic or extracting the floor characteristic from the map at a location indicated by the available location estimate. Based on the floor characteristic, apparatus 40 then determines at least one floor detection parameter, e.g. by selection from a set of different floor detection parameters (wherein e.g. there is a respective at least one floor detection parameter for each possible floor characteristic). This set may for instance be stored in memory 44, or in another database accessible to apparatus 40. The determined floor detection parameter is then, for instance together with fingerprint information determined and provided by terminal 3, used in a floor detection process, which may be part of a process for estimating a position of terminal 3.

In another example embodiment of the present disclosure, apparatus 40 represents terminal 3 of FIG. 1, and implements steps 201 and the first alternative of step 202 of FIG. 2 as well as the floor detection process. Apparatus 40 then for instance determines a floor characteristic of the building from a map of the building that is stored e.g. in data memory 44. Therein, an e.g. coarse location estimate that is available to apparatus 40 (e.g. from a previous step of estimating a location of terminal 3) is used for determining the floor characteristic, e.g. by searching the map for the floor characteristic or extracting the floor characteristic from the map at a location indicated by the available location estimate. Based on the floor characteristic, apparatus 40 then determines at least one floor detection parameter, e.g. by selection from a set of different floor detection parameters (wherein e.g. there is a respective at least one floor detection parameter for each possible floor characteristic). This set may for instance be stored in memory 44, or in another database accessible to apparatus 40. The determined floor detection parameter is then, for instance together with fingerprint information determined by terminal 3, used in a floor detection process, which may be part of a process for estimating a position of terminal 3.

In a further example embodiment of the present disclosure, apparatus 40 represents server 4 of FIG. 1, and implements steps 201 and the second alternative of step 202 of FIG. 2 (but not the floor detection process). Apparatus 40 then for instance determines a floor characteristic of the building from a map of the building that is stored in database 5 or in data memory 44. Therein, an e.g. coarse location estimate that is available to apparatus 40 (e.g. from a previous step of estimating a location of terminal 3) is used for determining the floor characteristic, e.g. by searching the map for the floor characteristic or extracting the floor characteristic from the map at a location indicated by the available location estimate. Based on the floor characteristic, apparatus 40 then determines at least one floor detection parameter, e.g. by selection from a set of different floor detection parameters (wherein e.g. there is a respective at least one floor detection parameter for each possible floor characteristic). This set may for instance be stored in memory 44, or in another database accessible to apparatus 40. The determined floor detection parameter is then provided to terminal 3, to enable terminal 3 to perform the floor detection process at least partially based on the obtained floor detection parameter.

In a further example embodiment of the present disclosure, apparatus 40 represents terminal 3 of FIG. 1, and implements steps 301 and 302 of FIG. 3. This example embodiment complements the previous example embodiment, where the floor detection parameter is provided by server 4 to terminal 3. After receiving the floor detection parameter, apparatus 40 (terminal 3) uses the floor detection parameter, for instance together with fingerprint information determined by apparatus 40, in a floor detection process, which may be part of a process for estimating a position of terminal 3.

In further example embodiments of the present disclosure, a method is disclosed, the method comprising:
extracting from an indoor map information about the venue type (open, closed) and
selecting the floor detection parameter set from a bank of parameter sets, wherein the bank comprises different floor detection parameter sets for:
(i) buildings with closed floors (e.g. building with well-defined floors, no vertical openings, but still significant radio signal leakage from one floor to another);
(ii) buildings with isolated floors (e.g. parking halls and similar with heavy structures stopping radio signals from penetrating from one floor to another);
(iii) buildings with open floors (e.g. vertical openings from floor to floor);
using the selected parameter set in the floor detection process.

It will be understood that it may for instance also be that the parameter set selection is not just building-based, but a given building may also have different floor characteristics in different areas, e.g. floors or floor sections. To exemplify, in an office building there may be areas with 'closed floors', but there may also be corridors/atrium with 'open floors' (vertical openings). Thus, at the extreme the floor detection parameter set selection may be location-dependent (instead of being simply building-dependent). However, a map of the building, in particular an indoor map of the building will be required in order to deduce, in which environment type the user is.

Exemplary embodiments of the present disclosure thus allow at least one floor detection parameter to be determined for instance from a map of the building, in particular an indoor map of the building as disclosed above. The map of the building may for instance have information on one or more opening(s), e.g. passages, between floors or floor sections of the building. These may for instance be elevators, escalators and/or stairs to name but a few typical examples. Crucially, information about one or more opening(s) of the building between floors or floor sections may be needed.

When a location of an electronic device of a user is known, e.g. based on indoor positioning like WiFi positioning (where information on WiFi beacons (e.g. WiFi access points) that can be observed by the electronic device at the location of the electronic device is compared against a radiomap that stores, for at least a plurality of locations, information on the WiFi beacons that are observable at the respective position, in order to determine the location of the electronic device), it may for instance be possible to analyse a floor characteristic of the building in the neighbourhood of the location of the electronic device. Thus, it may for instance be deduced from the map of the building, if the floors or floor sections in the neighbourhood are of open-floor type, isolated-floor type or of closed-floor type. For example, it may be deduced that the floors are isolated and no radio signal passage-ways between floors or floor sections exist within the building, or that there are radio signal passage-ways between floors or floor sections within the building. Depending upon the results, floor detection parameter are determined and tuned for being used in or provided to a floor detection process (which may for instance be a part of a process for determining a position/location of the electronic device, in particular if a floor level represents the vertical component of a three-dimensional position estimate that further comprises two-dimensional horizontal coordinates specifying the two-dimensional location of the electronic device on the floor indicated by the floor level).

A floor characteristic of a building may for instance be set a-priori to a map of the building. During the map making process or thereafter, e.g. a human operator may for instance indicate at various places information about the environment characteristics as a floor characteristic of the building. If such information is available, the information may for instance be simply extracted from the map and the at least one floor detection parameter may be selected based on that.

In this exemplary way, at least one floor detection parameter that may be tuned based on a floor characteristic of the building may vary. For example, the at least one floor detection parameter may be or comprise a parameter related to a strength of a signal received from a beacon and affecting whether or not the beacon is considered in the floor detection process (e.g. as cut-off values or threshold value defining what is the maximum (or minimum) signal strength for a beacon in order to be considered in the floor detection process). For instance, in open spaces (e.g. of open-floor type) it may be very probable that a beacon that can be heard with high signal strength in floor N can also be heard with high signal strength at floors N−1 (one floor below) and N+1 (one floor above). Such beacons may not particularly contribute to the floor detection process. Actually, such beacons may cause confusion, and it thus may be better to exclude such strongly received beacons from the analysis in open (e.g. open-type) spaces. This may be even more emphasized if the floor detection process is configured to work with a limited number of beacons. If this limited number of beacons is dominated by beacons the signals of which are received with high RSS values, the fingerprints may look quite similar at the same horizontal position on adjacent floors. In isolated (e.g. isolated-floor type) or closed (e.g. closed-type) space, on the other hand, it may be better to use every beacon, for instance because in any case the overall target may be to use as many beacons as possible. The floor detection parameter may thus for instance be an RSS threshold, for instance given in dB or dBm, and/or determined based on measurements and/or simulations. In the floor detection process, then for instance only beacons are considered or used the signals of which are received at the electronic device with an RSS that is smaller than or smaller-than-or-equal-to the RSS threshold Further, if has been found that the floor detection process (e.g. an algorithm used by the floor detection process) has different performance in different types of environment (e.g. open-floor type, isolated-floor type, or closed-floor type). The floor detection process may thus for instance be tuned—by using the floor detection parameter—to be less sensitive in specific environments, e.g. in order to prevent random mistakes from taking place. For instance, in the isolated-type or closed-type environment, floor detection may typically be more accurate and stable, so that one could allow floor changes to be decided practically as soon as the algorithm indicates so. However, in other environments (e.g. in open-type environments), the detection may be less stable, so that it may be preferable to collect some evidence of a change before actually deciding (and e.g., outputting) that a floor change has taken place. This may cause delay in the decision on floor changes, when there has been a real change, but can nevertheless prevent incorrectly decided floor changes.

The following embodiments of the present disclosure shall also be considered to be disclosed:

Embodiment 1

A method performed and/or controlled by at least one apparatus, the method comprising:
   determining at least one floor detection parameter based on a floor characteristic of a building;
   using the at least one floor detection parameter in a floor detection process or providing the floor detection parameter for use in a floor detection process.

Embodiment 2

A method performed and/or controlled by at least one apparatus, the method comprising:
   receiving at least one floor detection parameter determined based on a floor characteristic of a building;
   using the at least one floor detection parameter in a floor detection process.

Embodiment 3

The method according to any of the embodiments 1-2, wherein the at least one floor detection parameter comprises one or more of the following:
   a parameter related to strength of a signal received from a beacon and affecting whether or not the beacon is considered in the floor detection process;
   a parameter related to a sensitivity of the floor detection process.

Embodiment 4

The method according to any of the embodiments 1-3, wherein the floor characteristic is related to one or more of the following:
   a closed-floor type of at least part of the building;
   an open-floor type of at least part of the building;
   an isolated-floor type of at least part of the building.

Embodiment 5

The method according to any of the embodiments 1-4, wherein determining of the at least one floor detection parameter comprises selecting the at least one floor detection parameter from a set of at least two different floor detection parameters based on the floor characteristic.

Embodiment 6

The method according to any of the embodiments 1-5, the method further comprising:
   determining the floor characteristic from a map of the building.

Embodiment 7

The method according to any of the embodiments 1-6, the method further comprising:
   extracting from a map of the building a floor characteristic related to a venue type of the building; and
   selecting the at least one floor detection parameter based on the extracted floor characteristic

Embodiment 8

The method according to any of the embodiments 1-7, wherein the at least one floor detection parameter is based on a floor characteristic related to a venue type of the building extracted from a map of the building.

Embodiment 9

The method according to any of the embodiments 6-8, wherein the map of the building is at least indicative of openings within at least one floor or floor section of the building.

Embodiment 10

The method according to any of the embodiments 6-9, wherein the map of the building is at least indicative of openings between at least two floors or floor sections of the building.

Embodiment 11

The method according to any of the embodiments 1-10, wherein the floor characteristic is location-dependent within the building.

Embodiment 12

The method according to any of the embodiments 1-11, wherein the floor characteristic is location-dependent within the building, the method further comprising:
   determining the floor characteristic from a map of the building under consideration of a location within the building for which the floor detection process shall be performed.

Embodiment 13

The method according to any of the embodiments 1-12, comprising:
   adaptively determining the at least one floor detection parameter during the floor detection process or providing an adaptively determined at least one floor detection parameter for use in a floor detection process.

Embodiment 14

The method according to any of the embodiments 1-13, wherein a Kalman filter and/or an extended Kalman filter is used for the floor detection process.

Embodiment 15

The method according to any of the embodiments 1-14, wherein the floor detection process is a nonlinear process.

Embodiment 16

A computer program code, the computer program code when executed by a processor causing an apparatus to perform the method of any of embodiments 1-15.

Embodiment 17

An apparatus configured to perform and/or control or comprising respective means for performing and/or controlling the method of any of the embodiments 1-15.

Embodiment 18

An apparatus comprising at least one processor and at least one memory including computer program code, the at least one memory and the computer program code configured to, with the at least one processor, cause an apparatus at least to perform and/or control the method of any of the embodiments 1-15.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program code) may also be used in a corresponding manner in an example embodiment of any other category. It should also be understood that presence of a feature in the presented example embodiments shall not necessarily mean that this feature forms an essential feature of the disclosure and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The disclosure has been described above by means of example embodiments. It should be noted that there are alternative ways and variations which are obvious to a skilled person in the art and can be implemented without deviating from the scope of the appended claims.

The invention claimed is:

1. A method performed and/or controlled by at least one apparatus, the method comprising:
   determining, using a processor, at least one floor detection parameter, based on a floor characteristic of a building characterized by signal propagation between floors within the building for categorizing a floor type, wherein the floor characteristic is related to an amount of radio signal leakage or penetration between the floors,
   wherein the determining of the at least one floor detection parameter comprises selecting the at least one floor detection parameter based on the floor characteristic, the at least one floor detection parameter selected based on two floor types selected from a closed-floor type of at least part of the building, an open-floor type of at least part of the building, or an isolated-floor type of at least part of the building,
   wherein the at least one floor detection parameter comprises a parameter related to strength of a signal received from a beacon and affecting whether or not the beacon is considered in a floor detection process; and
   using the floor detection parameter based on the floor type in the floor detection process or providing the floor detection parameter for use in a floor detection process.

2. The method according to claim 1, wherein the at least one floor detection parameter comprises a parameter related to a sensitivity of the floor detection process.

3. The method according to claim 1, the method further comprising:
   determining the floor characteristic from a map of the building.

4. The method according to claim 1, the method further comprising:
   extracting from a map of the building a floor characteristic related to a venue type of the building; and
   selecting the at least one floor detection parameter based on the extracted floor characteristic.

5. The method according to claim 1, wherein the at least one floor detection parameter is based on a floor characteristic related to a venue type of the building extracted from a map of the building.

6. The method according to claim 3, wherein the map of the building is at least indicative of openings between at least two floors or floor sections of the building.

7. The method according to claim 1, wherein the floor characteristic is location-dependent within the building.

8. The method according to claim 1, wherein the floor characteristic is location-dependent within the building, the method further comprising:
  determining the floor characteristic from a map of the building under consideration of a location within the building for which the floor detection process shall be performed.

9. The method according to claim 1, comprising:
  adaptively determining the at least one floor detection parameter during the floor detection process or providing an adaptively determined at least one floor detection parameter for use in a floor detection process.

10. The method according to claim 1, wherein a Kalman filter and/or an extended Kalman filter is used for the floor detection process.

11. The method according to claim 1, wherein the floor detection process is a nonlinear process.

12. A tangible computer-readable medium storing a computer program code, the computer program code when executed by a processor causing an apparatus to perform and/or control the method of claim 1.

13. An apparatus comprising at least one processor and at least one memory including computer program code, the at least one memory and the computer program code configured to, with the at least one processor, cause an apparatus at least to per-form and/or control the method of claim 1.

14. A method performed and/or controlled by at least one apparatus, the method comprising:
  determining, using a processor, at least one floor detection parameter, based on a floor characteristic of a building characterized by signal propagation between floors within the building for categorizing a floor type, wherein the floor characteristic is related to an amount of radio signal leakage or penetration between the floors,
  wherein the determining of the at least one floor detection parameter comprises selecting the at least one floor detection parameter based on the floor characteristic, the at least one floor detection parameter selected based on two floor types selected from a closed-floor type of at least part of the building, an open-floor type of at least part of the building, or an isolated-floor type of at least part of the building,
  wherein the at least one floor detection parameter comprises a parameter related to strength of a signal received from a beacon and affecting whether or not the beacon is considered in a floor detection process; and
  using the floor detection parameter based on the floor type in the floor detection process or providing the floor detection parameter for use in a floor detection process.

15. A non-transitory tangible computer-readable medium storing a computer program code, the computer program code when executed by a processor causing an apparatus to perform and/or control the method of claim 14.

16. An apparatus comprising at least one processor and at least one memory including computer program code, the at least one memory and the computer program code configured to, with the at least one processor, cause an apparatus at least to per-form and/or control the method of claim 14.

* * * * *